United States Patent [19]

O'Connor

[11] Patent Number: 4,959,530

[45] Date of Patent: Sep. 25, 1990

[54] ARTICLE PRICE INDICATOR

[75] Inventor: David F. O'Connor, Delray Beach, Fla.

[73] Assignee: Checkrobot Inc., Deerfield Beach, Fla.

[21] Appl. No.: 320,236

[22] Filed: Mar. 7, 1989

[51] Int. Cl.$^5$ .............................................. G06K 19/06
[52] U.S. Cl. .................................... 235/383; 235/385; 177/1; 364/466
[58] Field of Search .................... 235/383, 388; 177/1; 364/466

[56] References Cited

U.S. PATENT DOCUMENTS 4,373,133 2/1983 Clyne .................................. 235/383

Primary Examiner—Harold I. Pitts
Attorney, Agent, or Firm—Robin, Blecker, Daley & Driscoll

[57] ABSTRACT

Apparatus for providing price indication of articles selected for purchase prior to actual purchase embodies a system having a reader for reading article UPC indication and generating output signals indicative thereof, a comparator for receipt of the reader output signals and for providing at least first and second output signals upon respective determinations that such received signals are indicative of an article retailed by bulk weight pricing or an article retailed per piece pricing, a scale accessible to a customer for weighing the articles and generating output signals indicative of the weight thereof, a numeric entry unit accessible to a customer for entering the numbers of pieces of the selected articles and generating output signals indicative of such entered numbers, and a display accessible to the customer and responsive to the first and second comparator output signals respectively to provide indication to the customer for usage of the scale or the numeric entry unit. The system further includes units for article price computation and display thereof.

16 Claims, 3 Drawing Sheets

ARTICLE PRICE INDICATOR

FIELD OF THE INVENTION

This invention relates generally to article price indication and pertains more particularly to systems and apparatus for announcing and displaying the price of articles selected for purchase in a supermarket or like retail facility.

BACKGROUND OF THE INVENTION

Point of sale (POS) indicators are in present widespread use in supermarkets, providing for the visual display of the price of an article at the time of its purchase, i.e., after the checkout clerk has scanned the article bar code or otherwise entered the article as a sold article.

Legislation recently enacted, e.g., in the state of Connecticut, requires the food retailer to provide customers with the capability to check the price of the article selected for purchase at a time prior to making a decision to purchase the article. The presently used POS indicators evidently do not meet the requirement of the legislation, since the price indication takes place only after the decision to purchase.

SUMMARY OF THE INVENTION

The present invention has as its primary object the provision of article price indicators complying with the noted legislation.

A more particular object of the invention is to provide systems and apparatus for providing visual and/or audible indication of the prices of articles selected for purchase in food retail facilities prior to purchase.

A further object of the invention is the provision of systems and apparatus for providing pre-purchase indication of the prices of articles selected for purchase in food retail facilities inclusive of both grocery and produce articles.

In attaining the foregoing and other objects, the invention provides in broad aspect, in combination, in a system for providing output indication of the price of articles selected for purchase prior to actual purchase thereof, a reader for reading article UPC indication and generating output signals indicative thereof, a comparator for receipt of the reader output signals and for providing at least first and second output signals upon respective determinations that such received signals are indicative of an article retailed by bulk weight pricing or an article retailed per piece pricing, a scale accessible to a customer for weighing the articles and generating output signals indicative of the weight thereof, a numeric entry unit accessible to a customer for entering the numbers of pieces of the selected articles and generating output signals indicative of such entered numbers, and a display accessible to the customer and responsive to the first and second comparator output signals respectively to provide indication to the customer for usage of the scale or the numeric entry unit.

In more particular aspect, the invention provides apparatus physically separate from the actual checkout station of a retail facility and comprising a system having, in combination, a reader for reading article UPC indication and generating output signals indicative thereof and a comparator for receipt of the reader output signals and for providing first, second and third output signals respectively indicating that (1) the UPC indication in the reader output signals is for an article retailed by bulk weight pricing, (2) the UPC indication in the reader output signals is for an article retailed per piece pricing (3) the UPC indication in the reader output signals is for an article not retailed by bulk weight pricing and not retailed per piece pricing. Further included in the apparatus is a scale, use of which is prompted by the comparator indication (1) and a key pad accessible to the consumer for entering the number of pieces of the selected article, use of the key pad being prompted by the comparator indication (2).

The apparatus has storage, or access to facility storage, of article prices according with comparator indications (1)-(3), and computational facility for computing price upon comparator indication (1) and the scale output and for computing price upon comparator indication (2) and the key pad entry.

The storage price output in the case of comparator indication (3) and the computational facility outputs in the cases of comparator indications (1) and (2) are furnished to price indication units, which may comprise a visual price display, an audible price annunciator, or both as desired.

The foregoing and other objects and features of the invention will be further understood from the following detailed description of preferred embodiments and practices of the invention and from the drawings wherein like reference numerals identify like parts and components throughout.

DETAILED DESCRIPTION OF PREFERRED EMBODIMENTS AND PRACTICES

Figure 1:
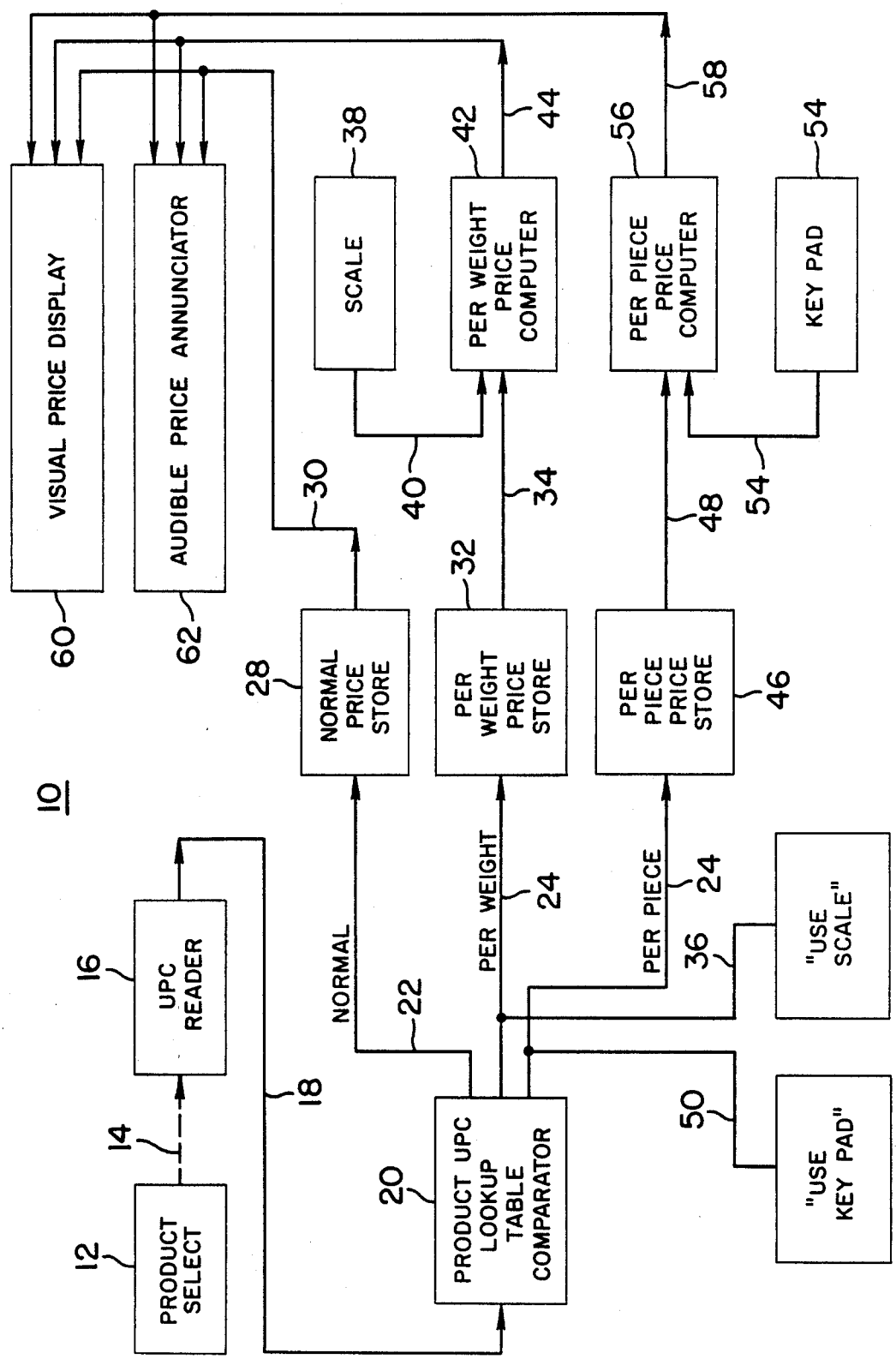
FIG. 1 is a block diagram of a system in accordance with the invention, various components of the consumer-accessible apparatus being included in block form.

Referring to FIG. 1, system 10 in accordance with the invention includes a product select aspect 12, wherein a customer selects articles for purchase, dotted line 14 indicating the mechanical passing of the selected articles individually to UPC reader or scanner 16. The output of reader 16 is applied over line 18 to a product UPC lookup table comparator 20. Comparator 20 includes in storage all UPC identifications cross-correlated with the articles to provide the indications (1)-(3) above noted.

The comparator regenerates the input UPC signal as NORMAL, on line 22 where the UPC lookup establishes that the input UPC signal corresponds to an article which bears a source-applied UPC indication, i.e., as being not PER WEIGHT and not PER PIECE.

Comparator 20 provides output indication as PER WEIGHT on line 24 where the UPC lookup establishes that the input UPC signal corresponds to an article which bears a customer-applied UPC indication and is to be sold by bulk weight.

Comparator 20 provides output indication as PER PIECE on line 26 where the UPC lookup establishes that the input UPC signal corresponds to an article which bears a customer-applied UPC indication and is to be sold at a certain price per unit.

The line 22 NORMAL signal is applied to NORMAL price store 28 and responsive thereto, article price is obtained directly from memory cross-correlating UPC and price. The price is output on line 30 for use discussed below.

The line 24 PER WEIGHT signal is applied to PER WEIGHT price store 32 which is responsive thereto to provide an output signal on line 34 indicative of the price per unit weight for the article corresponding to the UPC indication in the line 24 signal. The line 24 PER WEIGHT signal also prompts a display over line 36 to the customer, e.g., "USE SCALE". Scale 38 is customer-accessible and, upon placement of the article selected for price inquiry on the scale and settling thereof, a weight-indicative signal is provided on line 40. The signals on line 34 and line 40 are applied to PER WEIGHT price computer 42, which multiplies the weight by the price per unit weight to obtain the cost for the selected article. An output signal indicative of such cost is applied to line 44, again for use discussed below.

The line 26 PER PIECE signal is applied to PER PIECE price store 46 which is responsive thereto to provide an output signal on line 48 indicative of the price per piece for the article corresponding to the UPC indication in the line 26 signal. The line 26 PER PIECE signal also prompts a display over line 50 to the customer, e.g., "USE KEY PAD". Key pad 52 is customer-accessible and, upon customer entry of the numbers of the article selected into the key pad, a numbers-indicative signal is provided on line 54. The signals on line 48 and line 54 are applied to PER PIECE price computer 56, which multiplies the number indication by the price per piece to obtain the cost for the selected article. An output signal indicative of such cost is applied to line 58, again for use discussed below.

The signals on lines 30, 44 and 58 are shown as being applied to visual price display 60 and to audible price annuciator 62 and, as will be appreciated from the UPC discriminating action of comparator 20, only one of the three lines will have display-operating signals at any given time. The signals activate the display 60 or annunciator 62 to provide indication of the price of the article selected for purchase. The invention contemplates the use of either type of indicator, or both, and further contemplates the common usage of indicators 60 and/or 62 for the prompts "USE SCALE" and/or "USE KEY PAD", such that the prompts do not require a separate display unit and that the prompts may be both visual and audible.

Figure 2:
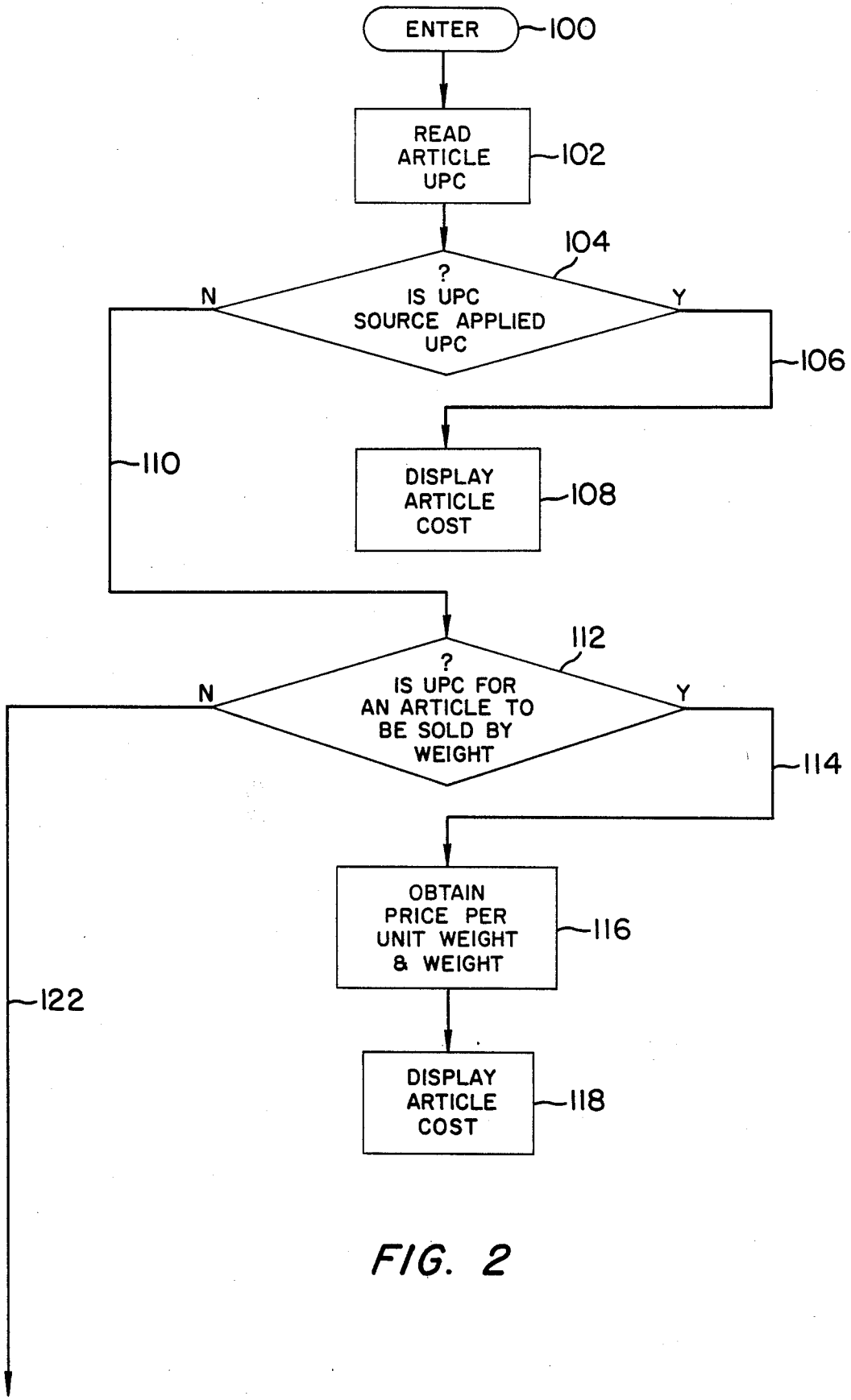
FIGS. 2 and 3 are flow charts of the operations involved in the system and practice of the invention.
Figure 3:
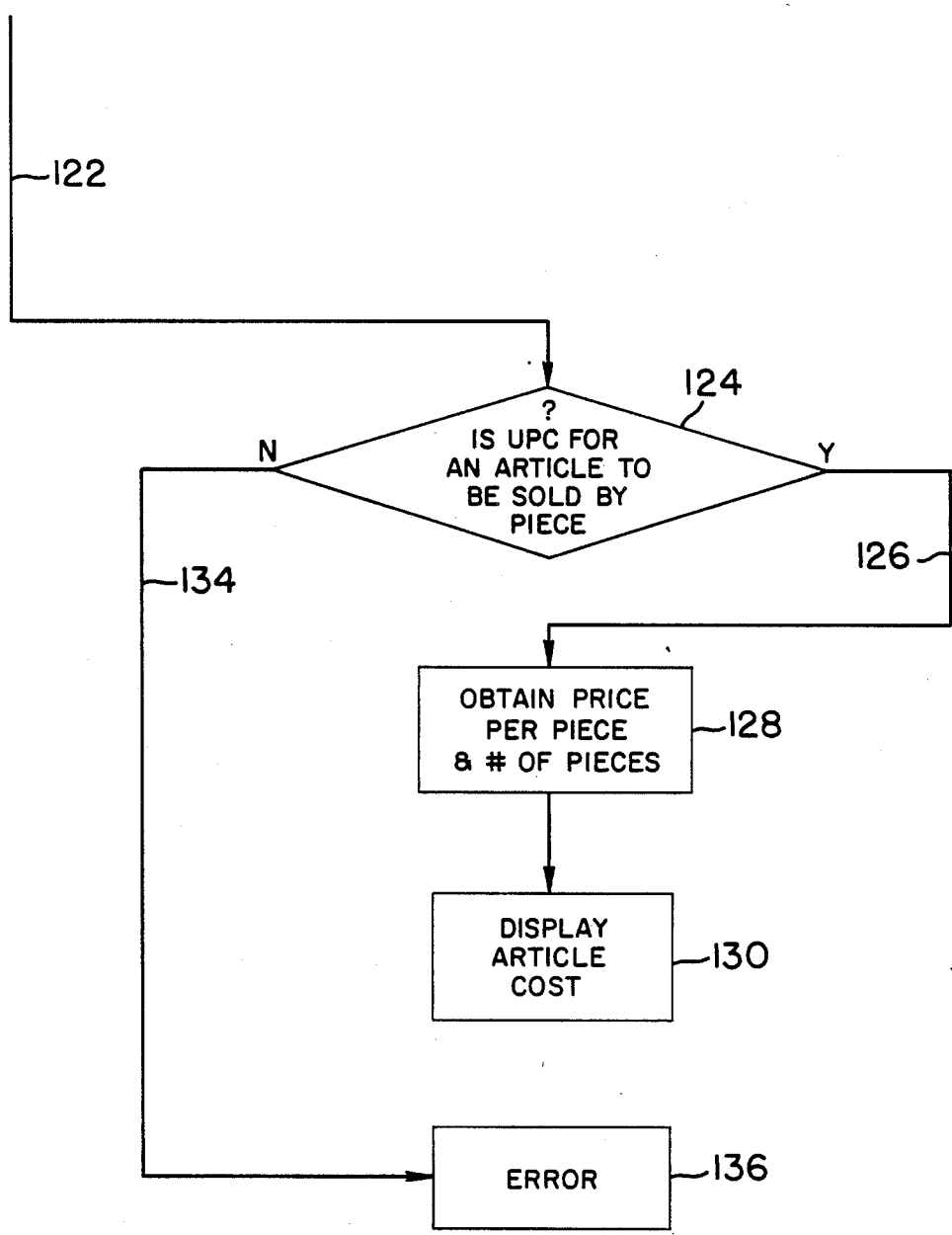

Logic operations, indicative particularly of those of comparator 20 and computers 42 and 56, will be further understood from the flow charts of FIGS. 2 and 3.

System 10 is entered (ENTER) in step 100. In step 102 (READ ARTICLE UPC), article UPC is scanned. In step 104(? IS UPC SOURCE-APPLIED UPC), a determination is made as to whether the article is of the customary type, having its UPC indication applied at the point of origin. If this inquiry is answered in the affirmative, line 106 leads to step 108 (DISPLAY ARTICLE COST). This is done through use of unit 28 of FIG. 1.

If the step 104 inquiry is answered in the negative, line 110 leads to step 112 (? IS UPC FOR AN ARTICLE TO BE SOLD BY WEIGHT), determination is made as to whether the article is of type to be bulk weight retailed. If yes, line 114 leads to step 116 (OBTAIN PRICE PER UNIT WEIGHT & WEIGHT), wherein reference is made to the aforementioned prompt to the customer for scale use and actual weight indication and to memory correlating UPC and price per unit weight. Step 118 follows (DISPLAY ARTICLE COST), wherein the weight indication is multiplied by the per unit weight price in unit 42 of FIG. 1.

In the event that the response to the step 112 inquiry is answered in the negative, line 122 leads to step 124 (? IS UPC FOR AN ARTICLE TO BE SOLD BY PIECE), determination is made as to whether the article is of type to be piece retailed. If yes, line 126 leads to step 128 (OBTAIN PRICE PER PIECE & #0 PIECES), wherein reference is made to the actual piece count and prompt to the customer to enter the same and to memory correlating UPC and price per unit weight. Step 130 follows (DISPLAY ARTICLE COST), wherein the piece count indication is multiplied by the per piece price.

In the event that the selected article is not found to be in any one of categories (1)–(3), as would be the case where negative response occurs in each of steps 104, 112 and 124, line 134 leads to step 136 (ERROR), wherein the subsystem provides output indication of an error condition to store personnel.

Various changes to the system block diagram and modifications to the practice discussed may be made without departing from the invention. Thus, the particularly described preferred embodiment and method are intended in an illustrative and not in a limiting sense. The true spirit and scope of the invention is set forth in the following claims.

What is claimed is:

1. In combination, in a system for providing output indication prior to actual purchase of the price of articles bearing universal product code (UPC) indication and selected for purchase:
   (a) reader means for reading article UPC indication and generating output signals indicative thereof;
   (b) comparator means for receipt of the reader means output signals and for providing at least first and second output signals upon respective determinations that such received signals are indicative of an article retailed by bulk weight pricing or an article retailed per piece pricing;
   (c) scale means accessible to a customer for weighing said articles and generating output signals indicative of the weight thereof;
   (d) numeric entry means accessible to a customer for entering the numbers of pieces of said selected articles and generating output signals indicative of such entered numbers; and
   (e) display means accessible to the customer and responsive to said first and second comparator means output signals respectively to provide indication to the customer for usage of said scale means or said numeric entry means.

2. The invention claimed in claim 1 further including storage means operatively responsive to said comparator means first and second output signals for respective issuance of first or second stored signals, said first stored signals being indicative of the price per unit weight of said selected articles and said second stored signals being indicative of the price per piece of said selected articles.

3. The invention claimed in claim 2 further including first computation means responsive to the receipt of said scale means output signal and said first stored signals for providing output signals indicative of the cost of said selected articles.

4. The invention claimed in claim 3 further including second computation means responsive to the receipt of said numeric entry means output signal and said second stored signals for providing output signals indicative of the cost of said selected articles.

5. The invention claimed in claim 4 further including display means responsive to said first computation means output signals and said second computation means output signals for displaying the cost of said selected articles to a customer.

6. The invention claimed in claim 5 wherein said display means comprises a unit providing visual display of the cost of said selected articles to a customer.

7. The invention claimed in claim 5 wherein said display means comprises a unit providing audible display of the cost of said selected articles to a customer.

8. The invention claimed in claim 5 wherein said display means comprises a unit providing both visual and audible display of the cost of said selected articles to a customer.

9. A system for providing output indication prior to actual purchase of the price of articles bearing universal product code (UPC) indication and selected for purchase, said system comprising:
   (a) reader means for reading article UPC indication and generating output signals indicative thereof;
   (b) comparator means for receipt of the reader output signals and for providing at least first and second output signals upon respective determinations that such received signals are indicative of an article retailed by bulk weight pricing or an article retailed per piece pricing;
   (c) scale means accessible to a customer for weighing said articles and generating output signals indicative of the weight thereof;
   (d) numeric entry means accessible to a customer for entering the numbers of pieces of said selected articles and generating output signals indicative of such entered numbers;
   (e) storage means operatively responsive to said comparator means first and second output signals for respective issuance of first or second stored signals, said first stored signals being indicative of the price per unit weight of said selected articles and said second stored signals being indicative of the price per piece of said selected articles;
   (f) first computation means responsive to the receipt of said scale means output signal and said first stored signals for providing output signals indicative of the cost of said selected articles;
   (g) second computation means responsive to the receipt of said numeric entry means output signal and said second stored signals for providing output signals indicative of the cost of said selected articles; and
   (h) display means responsive to said first computation means output signals and said second computation means output signals for displaying the cost of said selected articles to a customer.

10. The invention claimed in claim 9 wherein said display means comprises a unit providing visual display of the cost of said selected articles to a customer.

11. The invention claimed in claim 9 wherein said display means comprises a unit providing audible display of the cost of said selected articles to a customer.

12. The invention claimed in claim 9 wherein said display means comprises a unit providing both visual and audible display of the cost of said selected articles to a customer.

13. A system for providing output indication prior to actual purchase of the price of articles bearing universal product code (UPC) indication and selected for purchase, said system comprising:
   (a) reader means for reading article UPC indication and generating output signals indicative thereof;
   (b) comparator means for receipt of the reader output signals and for providing at least first and second output signals upon respective determinations that such received signals are indicative of an article retailed by bulk weight pricing or an article retailed per piece pricing;
   (c) scale means accessible to a customer for weighing said articles and generating output signals indicative of the weight thereof;
   (d) numeric entry means accessible to a customer for entering the numbers of pieces of said selected articles and generating output signals indicative of such entered numbers;
   (e) storage means operatively responsive to said comparator means first and second output signals for respective issuance of first or second stored signals, said first stored signals being indicative of the price per unit weight of said selected articles and said second stored signals being indicative of the price per piece of said selected articles;
   (f) first computation means responsive to the receipt of said scale means output signal and said first stored signals for providing output signals indicative of the cost of said selected articles;
   (g) second computation means responsive to the receipt of said numeric entry means output signal and said second stored signals for providing output signals indicative of the cost of said selected articles; and
   (h) display means accessible to the customer and responsive to said first and second comparator means output signals respectively to provide indication to the customer for usage of said scale means or said numeric entry means, said display means being further responsive to said first computation means output signals and said second computation means output signals for displaying the cost of said selected articles to a customer.

14. The invention claimed in claim 13 wherein said display means comprises a unit providing visual display of the cost of said selected articles to a customer.

15. The invention claimed in claim 13 wherein said display means comprises a unit providing audible display of the cost of said selected articles to a customer.

16. The invention claimed in claim 9 wherein said display means comprises a unit providing both visual and audible display of the cost of said selected articles to a customer.

* * * * *